United States Patent [19]
Rapp et al.

[11] Patent Number: 5,409,089
[45] Date of Patent: Apr. 25, 1995

[54] SHOCK ABSORBER

[75] Inventors: Wolfgang Rapp, Stuttgart; Bernd Dittmer, Ludwigsburg; Kurt Engelsdorf, Besigheim; Bernd Taubitz, Schwieberdingen; Steffen Schneider, Tamm-Hohenstange; Roland Weisser, Ditzingen, all of Germany

[73] Assignee: Robert Bosch GmbH, Stuttgart, Germany

[21] Appl. No.: 8,229

[22] Filed: Jan. 21, 1993

Related U.S. Application Data

[63] Continuation of Ser. No. 514,471, Apr. 25, 1990, abandoned.

[30] Foreign Application Priority Data

May 26, 1989 [DE] Germany ............... 39 17 063.2
Nov. 14, 1989 [DE] Germany ............... 39 37 795.4

[51] Int. Cl.⁶ .......................... F16F 9/46; B60G 17/00
[52] U.S. Cl. .................................. 188/299; 188/314; 188/319
[58] Field of Search ............... 188/299, 280, 282, 285, 188/314, 319, 322.15; 251/129.15; 280/707

[56] References Cited

U.S. PATENT DOCUMENTS

| | | | |
|---|---|---|---|
| 2,092,259 | 9/1937 | Padgett | 188/322.15 X |
| 4,484,669 | 11/1984 | Kato | 188/322.15 X |
| 4,696,379 | 9/1987 | Yamamoto et al. | 188/319 X |
| 4,800,995 | 1/1989 | Bernhardt et al. | 188/299 |
| 4,802,561 | 2/1989 | Knecht et al. | 188/299 |
| 4,893,699 | 1/1990 | Engelsdorf et al. | |
| 4,905,798 | 3/1990 | Engelsdorf et al. | |
| 4,958,704 | 9/1990 | Leiber et al. | 188/299 X |
| 5,004,079 | 4/1991 | Ivess et al. | 188/319 X |

FOREIGN PATENT DOCUMENTS

| | | | |
|---|---|---|---|
| 288736 | 11/1988 | European Pat. Off. | 188/299 |
| 3832625 | 4/1989 | Germany | 188/319 |
| 113980 | 5/1987 | Japan | 251/129.15 |

*Primary Examiner*—Matthew C. Graham
*Attorney, Agent, or Firm*—Edwin E. Greigg; Ronald E. Greigg

[57] ABSTRACT

A known shock absorber including a throttle cross section of a throttle passage which is electrically variable via a magnet, to adjust damping of fluid between separate work chambers. If the magnet has no current in the event of an electrical defect, then the throttle cross section of the throttle passage attains its minimum opening, and maximum damping is attained the shock absorber includes a different further throttle passage which is uncovered in the event of an electrical defect. As a result, in the event of an electrical defect an arbitrarily preselectable, preferably approximately average damping is brought about by the further throttle passage.

42 Claims, 2 Drawing Sheets

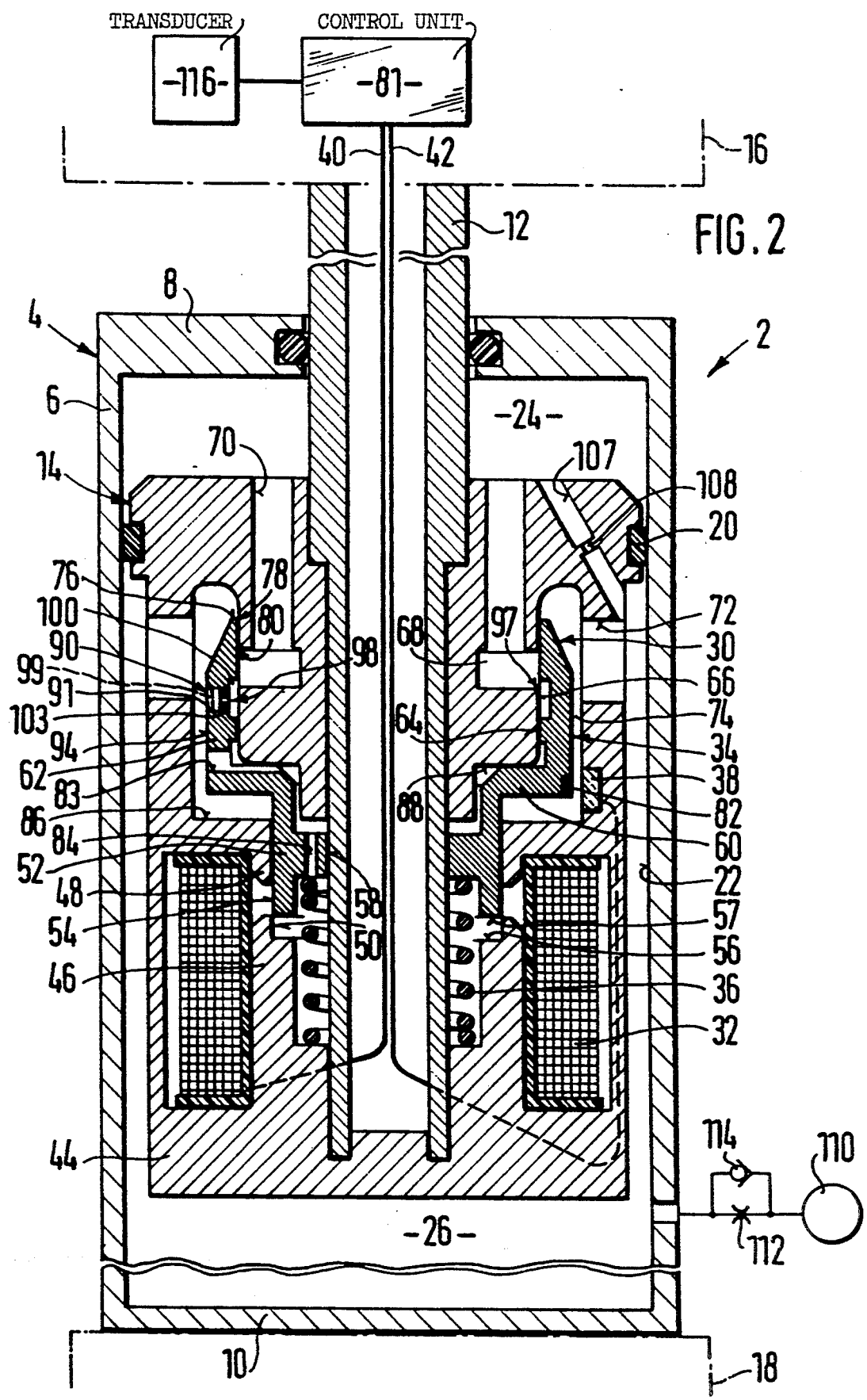

5,409,089

SHOCK ABSORBER

This is a continuation of application Ser. No. 07/514,471 filed on Apr. 25, 1990, now abandoned.

BACKGROUND OF THE INVENTION

The invention is based on a shock absorber as defined hereinafter. Shock absorbers are already known to applicants in which a damping action is variable by means of an electromagnetic adjuster. The adjuster includes a magnet coil and a control slide, and the control position of the control slide determines the throttling of the pressure fluid being exchanged between the work chambers.

In the version known to applicants, a throttle cross section in a throttle passage is opened to a variable extent depending a control position of a control slide. When there is maximum current to the magnet coil, the control slide is located in a terminal control position, in which a maximum-sized throttle cross section is uncovered in the throttle passage. The maximum throttle cross section means minimum damping by the shock absorber. Without current, the control slide is in another terminal control position, in which a minimum-sized throttle cross section is uncovered. The minimum cross section represents maximum damping by the shock absorber in the latter position.

In the event of an electrical defect, such as if the magnet coil fails or if a supply lead to the magnet coil breaks, maximum damping of the shock absorber is obtained. Although maximum damping by the shock absorber is necessary in some extreme situations, still in the case of a defect it is not an optimal compromise.

The adjuster may be provided either in the cylinder or outside the cylinder.

OBJECT AND SUMMARY OF THE INVENTION

By comparison, the shock absorber as defined hereinafter has a further throttle passage, with an advantage that in the event of a defect a preselectable, preferably approximately average damping of the shock absorber is established. This damping established in the event of a defect is independent of the maximum and minimum damping.

Providing a further throttle passage with at least two openings, preferably uniformly distributed over a circumference of the control slide, advantageously minimizes a force crosswise to an adjusting direction of the control slide.

Providing annular chambers on the control slide and on the valve body as components of a further throttle passage, so that the fluid under pressure can flow through these annular chambers in the event of an electrical defect, has an advantage, among others, that to attain the desired damping in the event of a defect only a short stroke of the control slide is necessary. Additionally and advantageously, an effective throttle area determining the damping may also be provided remote from the annular chambers, at any arbitrary point in the course of the further throttle passage.

A particularly advantageous feature is that at least one valve may be provided in the further throttle passage. The valve may have any arbitrary structure. This assures that in the event the second throttle cross section is opened, for instance because of a defect, then any arbitrary desired damping characteristic is advantageously attainable.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 shows a second embodiment, again in simplified form.

DESCRIPTION OF THE PREFERRED EMBODIMENTS

Figure 1:
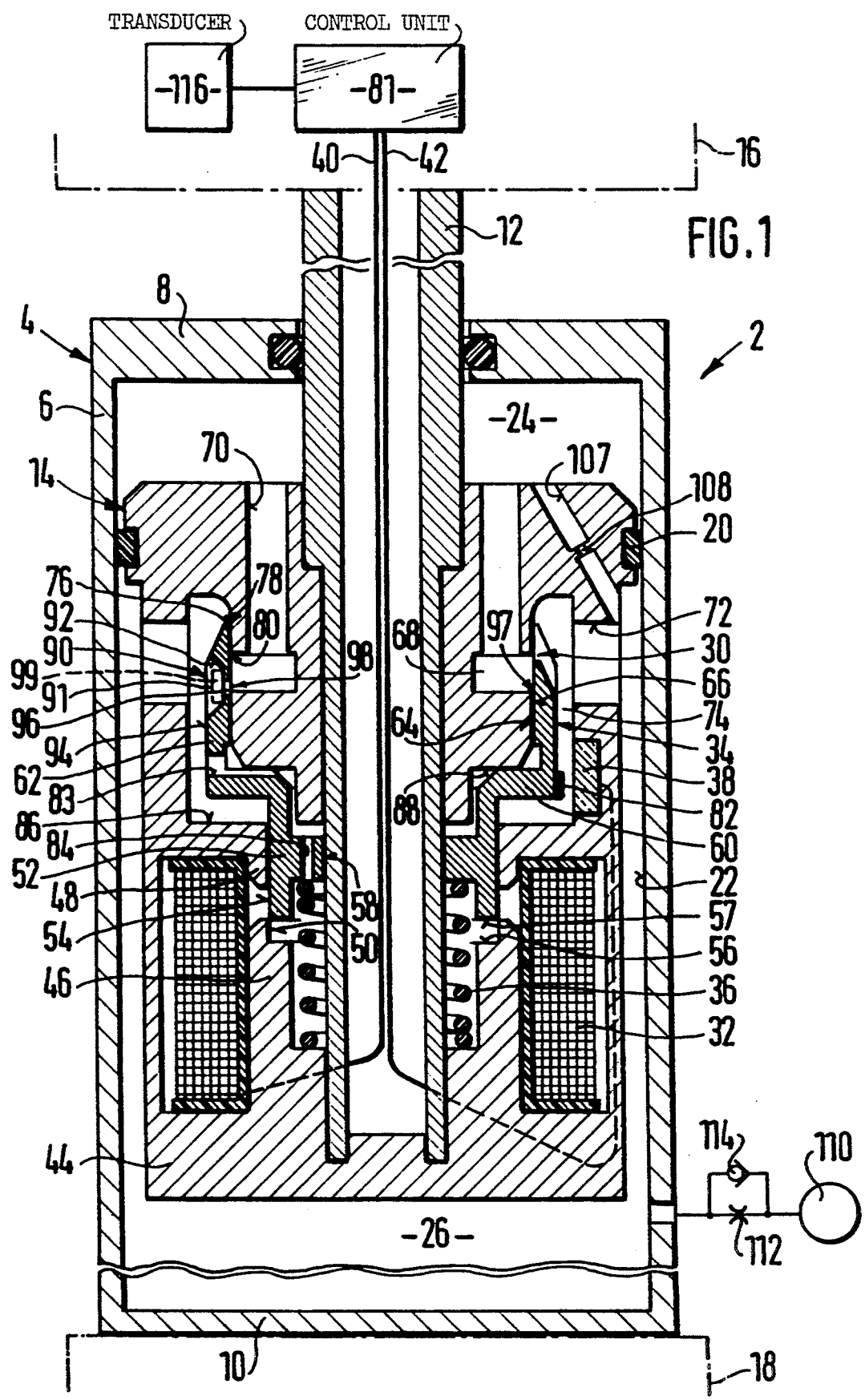
FIG. 1 shows a first exemplary embodiment of the invention, in simplified form.

FIG. 1 shows the first exemplary embodiment. A shock absorber 2 has a cylinder 4 with a jacket tube 6, shown in segments, having a first face end 8 and a second face end 10. A piston rod 12 protrudes from the first face end 8 of the jacket tube 6. Only the two ends of the piston rod 12 are shown. The piston rod 12 is connected by one end to a stepped damper piston 14 and by its other end it is pivotably connected to a first mass 16, represented by dot-dash lines. In other words, the damper piston 14 is connected to the first mass 16 via the piston rod 12. The second face end 10 of the cylinder 4 is connected to a second mass 18, again shown in dot-dash lines. The first mass 16 is a vehicle body, for example, while the second mass 18 is for example a vehicle axle. The damper piston 14 may slide axially on an inner jacket face 22 of the jacket tube 6, via an interposed guide ring seal 20. An interior of the cylinder 4 is divided by the damper piston 14 and the guide ring seal 20 into a first work chamber 24 and a second work chamber 26. In the drawing, the first work chamber 24 is above the damper piston 14 and guide ring seal 20, and the second work chamber 26 is below them. The work chambers 24, 26 are at least partly filled with a pressure fluid.

The two work chambers 24, 26 communicate with one another via a throttle passage 30. The throttle passage 30 includes a variable throttle cross section. The damper piston 14 includes the throttle passage 30, a magnet coil 32, a control slide 34, a restoring spring 36, and if desired a transducer 38.

The piston rod 12 is hollow and receives a first electrical supply line 40 to which the magnet coil 32 is connected. A second electrical supply line 42 likewise leads through the hollow piston rod 12 and is connected to the transducer 38. The magnet coil 32 is located inside a valve body 44, which forms part of the damper piston 14. On the inside of the magnet coil 32, the valve body 44 forms an annular first pole 46.

A second, likewise annular pole 48, which is connected to the valve body 44, extends axially in the direction toward the first pole 46, maintaining a certain distance from it to form a spacing therebetween. The first pole 46, provided with a coaxial bore 50, into which a portion of, an armature 52 of the tubular control slide 34 protrudes at least part way. Depending on the control position of the control slide 34 in the bore 50, the armature 52 not only extends along the second pole 48 in the axial direction but also more or less extends along the first pole 46. The air gaps that are definitive for a magnet force acting upon the armature 52 are located between a cylindrical outer jacket 54 of the armature 52 and the bore 50 forming the radial pole faces of the poles 46, 48, on the one hand, and between an axial step 56 of the first pole 46, which is set back in the manner of a blind bore, and a face end 57 of the armature 52 oriented toward the step 56.

An axial through bore 58 is located in the control slide 34, into which the piston rod 12 is inserted, making the control slide 34 axially slidingly displaceable on the piston rod. By means of the restoring spring 36 surrounding the piston rod 12, the control slide 34 is subjected to a restoring force acting in the axial direction, which tends to urge the control slide 34 away from the first pole 46. Correspondingly, the armature 52 and with it the control slide 34 are moved counter to the restoring force of the restoring spring 36 in the direction of an increased overlap between the cylindrical outer jacket 54 of the armature 52 and the first pole 46 when the magnet coil 32 is electrically excited. In other words, when excited, the electromagnet draws the armature toward the electromagent.

Remote from the restoring spring 36, the armature 52 merges, via an enlargement in the form of an annular disk 60, with a tubular control part 62 of the control slide 34, the diameter of the control part 62 in the exemplary embodiment shown being advantageously larger than the diameter of the armature 52. The control part 62, along with the armature 52, can either be an integral part of one component, that is, the control slide 34, as shown in the drawing, or else it may comprise two components joined together.

The tubular control part 62 of the control slide 34 is slidable with a fine-machined inner jacket face 64 on a likewise fine-machined jacket face 66 of the valve body 44.

An encompassing annular chamber 68 is machined into the jacket face 66 of the valve body 44. One or more axially eccentrically extending recesses 70 provides an opportunity for a fluid flow between the annular chamber 68 and the first work chamber 24. At least one flow opening 72 is machined radially around the annular chamber 68 and outside the control slide 34 in the valve body 44; this provides an opportunity for a flow between a control chamber 74 receiving the control slide 34 and the second work chamber 26 via an annular passage between the value body 44 and the inner surface 22 of the cylinder.

The length of the control slide 34 is dimensioned such that depending on the axial control position of the control slide 34, the control slide covers the annular chamber 68 to a greater or lesser degree in the axial direction. A face end 76 remote from the magnet coil 32 is located on the control part 62 of the control slide 34. The edge between the inner jacket face 64 and the face end 76 of the control slide 34 is embodied as a slide control edge 78, which in cooperation with a control edge 80 defining the annular chamber 68 determines the size of the variable throttle cross section of the first throttle passage 30. The recess 70, the annular chamber 68, the variable throttle cross section, the control chamber 74 and the flow opening 72 are components of the throttle passage 30 that connects the two work chambers 24, 26 during regular operation.

The transducer 38 is secured to the valve body 44 in the vicinity of the control slide 34 and serves to detect the control position of the control slide 34 relative to the valve body 44. The transducer 38, which for instance makes inductive or capacitive measurements, emits a measurement signal via the second supply line 42 to an electronic control unit 81, which via a setpoint/actual-value comparison operator generates a control signal that is delivered to the magnet coil 32 via the first supply lead 40. This forms a control circuit, and the control slide 34 can be positioned substantially more accurately, and more independently of tolerances, than would be possible without feedback of the actual position of the control slide 34. Depending on the manner in which the transducer 38 functions, it is necessary or at least practical for a suitable marking material 82 to be provided on the control slide 34, an example being a permanent magnet or a copper ring, so that the transducer 38 can satisfactorily detect the control position of the control slide 34.

The slide control edge 78 and/or the control edge 80 may be provided with a tooth profile having axially extending raised and depressed areas, as is known from U.S. Pat. No. 4,905,798.

The control slide 34 may be embodied such that no static hydraulic forces and no axial flow forces, or practically no axial flow forces, act upon the control slide 34. One of the provisions for this may be to embody the control slide 34 approximately as a sharp cutting edge in the vicinity of the face end 76, with relief connections 83 and 84 and/or a play between the control slide 34 and the valve body 44 or piston rod 12 assuring a pressure equilibrium. Further provisions for reducing the static forces and flow forces acting on the control slide 34 are disclosed in German Offenlegungsschrift 38 00 865. What is said of the shock absorber in U.S. Pat. 4,905,798 applies equally to the shock absorber of the present application.

Depending on the current to the magnet coil 32, the control slide 34 is actuated counter to the restoring force of the restoring spring 36. The control position of the control slide 34 is defined when the armature 52 of the control slide 34 comes to rest on the step 56, or the annular slide 60 comes to rest on another step 86 of the valve body 44, depending on the clearances among the components. With decreasing magnet force of the magnet coil 32, the restoring force of the restoring spring 32 actuates the control slide 34 in the opposite direction, until the annular disk 60 of the control slide 34 comes to rest on a further step 88 of the valve body 44. The annular disk 60 of the control slide 34 comes to rest on the step 88 whenever the magnet coil 32 has a relatively weak current or has no current running through it.

If there is a strong current through the magnet coil 32, then the slide control edge 78 moves far away from the control edge 80, and the variable throttle cross section of the throttle passage 30 is large; that is, the damping of the shock absorber is slight. If there is a weak current through the magnet coil 32, then the slide control edge 78 is flush with the control edge 80, or the slide control edge 78 covers the control edge 80 completely or partly, depending on the structural design, and the variable throttle cross section of the throttle passage 30 is small, so that the damping of the shock absorber is great. If there is no current through the magnet coil 32, for instance because of some electrical defect or other, then the annular disk 60 of the control slide 34 rests on the step 88, and the variable throttle cross section of the throttle passage 30 attains its minimum opening, or depending on the structural design is completely closed.

To assure that the maximum damping of the shock absorber will not ensue if there is some defect, such as an electrical failure, the control part 62 of the control slide 34 is provided with at least one radial opening 91. As a result, depending on the control position of the control slide 34, a further throttle passage 90 can be uncovered. The recess 70, the annular chamber 68, the opening or openings 91, the control chamber 74 and the flow opening 72 are components of the further throttle passage 90 connecting the two work chambers 24, 26 in the event of a defect. As shown in the drawing, the course of the flow of the throttle passage 30 and of the further throttle passage 90 may coincide intermittently, or they may have completely separate courses.

The opening 91 includes a countersunk portion 92, by way of example. The countersunk portion 92 extends from an outer jacket 94 of the control part 62 of the control slide 34 in the direction toward the jacket face 64; shortly before it reaches the jacket face 64, the countersunk portion 92 merges with a slit 96. The opening 91 comprises the countersunk portion 92 and the slit 96. This is particularly advantageous from a manufacturing standpoint. The slit 96 is preferably rectangular, but it may also be round, as an example. To make for the shortest possible structure of the shock absorber, it is favorable to make the slit 96 narrow and to align it in the circumferential direction. However, it is also possible to embody the opening 91 without any graduation, or in other words in the form of a simple through bore. If the slide control edge 78 is provided with at least one raised portion and one depression, then it is possible for the depression to merge, at a narrow point, with the opening 91 of the further throttle passage 90.

The annular chamber 68 is defined toward the jacket 66 of the valve body 44 by the control edge 80 and on the other side by a further edge 97. If the annular disk 60 of the control slide 34 is resting on the step 88 of the valve body 44, then the opening 91 of the further throttle passage 90 between the annular chamber 68 and the control chamber 74 is at least partly opened. The slit 96 of the throttle passage 90 may be disposed such that if the annular disk 60 of the control slide 34 rests on the step 88 of the valve body 44, the slit 96 is completely opened; alternatively the slit 96 may be disposed such that as shown in FIG. 1, it is partly covered by the edge 97 in this control position of the control slide 34.

To avoid radial forces on the control slide 34, or at least to keep such forces as small as possible, it is favorable to include a plurality of openings 91. It is particularly practical for the openings 91 to be disposed as uniformly as possible, that is, at equal intervals in the circumference of the control slide 34. If the further throttle passage 90 has two openings 91, then the openings should be provided diagonally opposite one another on the control slide 34. If there are at least two openings 91, it is practical to dispose them in the same way in the axial direction.

In the drawing, the control slide 34 is shown in the position when the magnet coil 32 has no current through it. The slide control edge 78 of the control slide 34 has a profile with axially extending raised portions and depressions. For FIG. 1, a longitudinal section through the shock absorber was selected in which the left-hand part of the drawing shows the control slide 34 in section in the vicinity of a raised portion, while the right-hand part of the drawing shows it in section in the vicinity of a depression. In the shock absorber shown as an example in FIG. 1, a minimal portion of the throttle passage 30 having the variable throttle cross section is still open even when the magnet coil 32 has no current through it. However, it is also possible to design the control slide 34 such that when there is no current through the magnet coil 32 the variable throttle cross section is completely closed. In the shock absorber 2 shown, the raised portions of the control slide 34 cover the control edge 80, and so the variable throttle cross section of the throttle passage 30 is formed only in the vicinity of the depressions, and comprises a plurality of variable throttle cross sections, depending on the number of raised and depressed portions. The section through the shock absorber 2 is selected such that in the left-hand part of the drawing it extends through an opening 91 of the second throttle passage 90.

In the regular operating state, that is, when the magnet coil 32 has current through it as intended, the control slide 34 is actuated counter to the restoring spring 36, far enough that the slit 96 of the opening 91 of the further throttle passage 90 is completed covered by the edge 97 of the valve body 44. Thus, during regular operation of the shock absorber the further throttle passage 90 is completely closed and thus is not in operation. In the regular operating state of the shock absorber 2, the pressure fluid can flow only through the throttle passage 30 having the variable throttle cross section. The shock absorber may be structurally designed such that in the regular operating state the throttle cross section of the throttle passage 30 is variable between a very small minimum and a very large maximum. In this way, in the regular operating state any desired damping of the shock absorber is attainable, and the shock absorber is able to rise to any situation that may occur and can satisfy any customer wishes.

If the magnet coil 32 loses current, however, or in some other way becomes inoperative because of some defect, then the restoring force of the restoring spring 36 actuates the control slide 34 counter to the step 88 of the valve body 44, and the throttle passage 30 is closed to an extent greater than normal. At the same time, however, if the control slide 34 is actuated farther than normal toward the step 88, the further throttle passage 90 opens.

Any throttling of the pressure fluid flowing through the further throttle passage 90 is substantially determined by a narrowest point of the further throttle passage 90. A hydraulically effective area 98 of this narrowest point will hereinafter be called the effective throttle area 98 of the further throttle passage 90. If the slit 96 is completely opened in the event of a defect, then the cross-sectional area of the slit 96 forms the effective throttle area 98 in a first approximation. However, if part of the slit 96 is covered by the edge 97 in the event of a defect, then the still-open part of the slit 96 roughly forms the effective throttle area 98. The effective throttle area 98 can be made up of a plurality of individual effective throttle areas of a plurality of slits 96 or openings 91.

The throttle area 98 of the further throttle passage 90 that is effective in the event of a defect can be selected to be arbitrarily large. This makes it possible to design the shock absorber such that in the event of a defect any arbitrarily selectable but preferably average damping is established, and extreme situations are avoided even if a defect should arise.

A valve 99 shown in dashed lines in the drawing may also be built into the opening 91, or into a plurality of openings 91, and thus into the further throttle passage 90. By way of example, the valve 99 may be a pressure limiting valve, in particular a plate valve or shutter valve, throttle valve, check valve, or a combination of these valves. Depending on the version of the valve 99, any arbitrary, desired damping characteristic can be provided for the shock absorber in the event of a defect, or in other words when the second throttle cross section 90 is uncovered. Here the effective throttle area 98 is formed inside the valve 99. A plurality of valves 99 could also be built into the further throttle passage 90; in that case, one of the valves 99 is for instance responsible for the damping when the pressure fluid flows out of the first work chamber 24 into the second work chamber 26, and another valve 99 is responsible for the damping when the flow is in the opposite direction, in which case the valve 99 not involved at a given time is closed.

It is also possible to control the shock absorber such that the further throttle passage 90 is uncovered not only in the event of a defect but also whenever the damping characteristic of the valve 99 is for instance desired.

It is also possible to provide, instead of the annular chamber 68, only individual radial openings through the valve body 44, similarly to the openings 91 through the control slide 34. However, the annular chamber 68 can also be shifted into the control slide 34, and the openings 91 and the valve 99 can be shifted into the valve body 44. Since these are simple construction variants, they need not be shown in the drawing.

To assure that a sufficiently large effective throttle area 98 is available in the event of a defect, the slit 96 must be large enough. To enable limiting the stroke of the control slide 34 to a reasonable amount, the slit 96 must not extend too far in the stroke direction; that is, it should be narrow in the direction of reciprocation. In that case, however, it must extend relatively far in the circumferential direction. It is not exactly easy to produce very narrow, long slits, from a manufacturing standpoint. An annular chamber 100 is therefore provided on the control slide 34 in the second exemplary embodiment of FIG. 2.

In all the drawing figures, elements that are the same or function the same are provided with the same reference numerals.

In the exemplary embodiment of FIG. 2, the further throttle passage 90 additionally includes the annular chamber 100. The annular chamber 100 interrupts the jacket face 64 of the control slide 34. The annular chamber 100 is a radial plunge cut on the jacket face 64 of the control slide 34. The opening 91 joins the annular chamber 100 to the outer jacket 94 remote from the annular chamber 100; that is, the opening 91 connects the annular chamber 100 to the second work chamber 26.

The annular chamber 100 is disposed on the jacket face 64 of the control slide 34 in such a way that there is no communication between the annular chamber 100 and the annular chamber 68 during regular operation of the shock absorber 2. In the case of a defect, or in other words if the restoring spring 36 actuates the control slide 34 counter to the step 88 of the valve body 44, then the annular chamber 100 moves at least part way beyond the stationary edge 97 of the valve body 44. In the case of a defect, the control slide 34 and annular chamber 100 are in a position in which a virtually unthrottling communication exists between the stationary annular chamber 68 and the annular chamber 100. Since the annular chamber 68 advantageously extends over the entire jacket face 66 of the valve body 44, and the annular chamber 100 extends over the entire circumference of the jacket face 64 of the control slide 34, in order to obtain a nonthrottling communication between the annular chamber 68 and the annular chamber 100, an advantageously small overlap between the annular chamber 68 and the annular chamber 100 that creates the communication is sufficient. The actual throttling of the pressure fluid flowing through the further throttling passage advantageously takes place substantially at the effective throttle area 98 of the opening or openings 91. The opening 91 can be arbitrarily embodied in the second embodiment of FIG. 2. It is particularly practical to make the opening 91 round. If needed, a shutter 103 can be disposed in or on the opening 91. The shutter 103 has a hole, which subtantially determines the effective throttle area 98 of the further passage 90. To obtain throttling of the flowing pressure fluid that is largely independent of its viscosity, it is suitable to make the hole passing through the shutter 103 as short as possible. The shutter 103 can also be advantageously replaced later on. If no shutter 103 is used, then the opening 91 itself can determine the effective throttle area 98.

In FIG. 2, the control slide 34 is shown in the position it assumes in the event of a defect. In this position, the further throttle passage 90 is opened. In the second exemplary embodiment, the control slide 34 is embodied such that in the event of a defect the throttle passage 30 having the variable throttle cross section is closed.

For the sake of simplicity, the valve body 44 is shown in the drawing as if it were made in one piece. However, to enable mounting of the magnet coil 32, the restoring spring 36 and control slide 34, for example, it is necessary to make the valve body 44 in a plurality of pieces and to join them later, which is familiar to anyone skilled in the art.

Besides the throttle passage 30 and the further throttle passage 90, the damper piston 14 may also be provided with at least one further flow connection 107. A variable or constant throttle or shutter 108 may for instance be located in this further flow connection 107.

In the exemplary embodiments shown, the throttle passage 30, the further throttle passage 90 and the flow connection 107 are disposed in the damper piston 14. However, it is also possible to dispose the throttle passages 30, 90 and/or the further flow connection 107 and/or further flow connections outside the damper piston 14, for instance on an outside surface of the jacket tube 6 of the cylinder 4, or on some partition, not shown, inside the cylinder 4.

When the piston rod 12 is driven into the cylinder 4, some of the pressure fluid is positively displaced out of the cylinder 4, as a function of the cross section of the piston rod. When the piston rod 12 is retracted from the cylinder 4, pressure medium should be capable of flowing back into the cylinder 4. For this purpose, the second work chamber 26 communicates with a compensation chamber 110. To enable generating a relatively high pressure in the second work chamber 26 and hence a relatively strong damping even when the pressure in the compensation chamber 110 is relatively low, a throttle 112 is installed between the compensation chamber 110 and the second work chamber 26. When the pressure fluid flows back out of the compensation chamber 110 into the second work chamber 26, the throttle 112 is unnecessary, and for this reason a check valve 114 is disposed parallel to this throttle 112. The check valve 114 is installed such that the pressure medium can flow through the check valve 114 only when the flow direction is out of the compensation chamber 110 into the work chamber 26. The compensation chamber 110 may for instance be a gas-filled pressure reservoir. Naturally, the compensation chamber 110 could also be integrated with the cylinder 4 in a known manner.

Depending on the desired damping and on the initial pressure of the gas in the compensation chamber 110, it may be possible to dispense with the throttle 112 and check valve 114.

To assure that the volume of pressure fluid positively displaced in one of the work chambers 24, 26 is equal to the volume flowing into the other work chamber when there is a relative motion between the damper piston 14 and the jacket tube 6, a double piston rod 12 may be used that protrudes from both ends of the damper piston 14, out of the face ends 8, 10 of the cylinder 4. It is particularly favorable if both ends of the double piston rod 12 have approximately the same diameter.

A single-tube shock absorber has been selected as an exemplary embodiment of the shock absorber according to the invention. This is merely an example, however. The shock absorber could equally well be a so-called double-tube shock absorber.

As already mentioned above, during regular operation the throttle passage 30 with its variable throttle cross section substantially determines the damping of the shock absorber; in the case of a defect, the further throttle passage 90 with the effective throttle area 98 primarily determines the damping of the shock absorber 2. As anyone skilled in the art knows, the damping of the shock absorber is dependent not only on a throttle cross section or area, but instead, the relative speed between the damper piston 14 and the jacket tube 6 naturally plays a role as well.

During regular operation the size of the variable throttle cross section of the throttle passage 30 can be set by a transducer 116, via the control unit 81. The transducer 116 may for instance be a sensor and/or a manual lever. If the shock absorber is provided with the further throttle passage 90 in accordance with the invention, then the variable throttle cross section of the throttle passage 30 can advantageously be designed to be variable within very wide limits, without any need to fear an undesirable or even dangerous extreme damping in the event of a defect.

In the exemplary embodiments shown in the drawing, the control part 62 of the control slide 34, viewed in the radial direction, surrounds the valve body 44 in the vicinity of the jacket faces 64, 66. However, a reverse arrangement is also possible, so that viewed in the radial direction, at least in the vicinity of the jacket faces 64, 66, the inside of the control slide 34 would merge directly with the valve body 44. In other words, at least in the vicinity of the pressure fluid transition between the valve body 44 and the control slide 34, the valve body 44 would surround the control slide 34. Since this is simply the reverse of the arrangement shown and is easily constructed, this variant embodiment is not shown in the drawing.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A shock absorber, including a cylinder, a damper piston displaceable in said cylinder, said damper piston divides said cylinder into a first and a second work chamber, said damper piston having at least one first throttle passage (30) having a variable throttle cross section in a fluid flow path between said first and said second work chambers, said first throttle passage (30) permits an alternate fluid flow in either direction from said first work chamber to the second work chamber and from said second work chamber to said first work chamber, a valve body, a valve chamber (68) in said valve body, a control slide that is adjustable with respect to said valve chamber in said valve body, a control device, an adjusting force means that acts upon said control slide counter to a restoring force of a restoring spring, said adjusting force means applies an adjusting force which acts upon said control slide brought about by signals from said control device for adjusting said control slide and said variable cross section, between a minimum and a maximum throttle cross section value, a control position of the control slide relative to said first valve chamber determines said variable throttle cross section of said at least one first throttle passage (30), and at least one second throttle passage (90) is provided in said control slide in which the at least one second throttle passage is covered when said control slide is in a position of maximum throttle cross section, if the adjusting force is inoperative, the control slide (34) is actuated into a terminal position by the restoring force of the restoring spring; and in the terminal position, the at least one second throttle passage (90) is uncovered, in said uncovered position, said at least one second throttle passage (90) permits a fluid flow in either direction, from, said first work chamber to said second work chamber and from said second work chamber to said first work chamber, the at least one second throttle passage (90) is larger than the minimum value of the variable throttle cross section of the at least one first throttle passage (30) and also smaller than the maximum value of the variable throttle cross section; and in the terminal position the variable throttle cross section of the at least one first throttle passage (30) and the at least one second throttle passage (90) allows pressure fluid to flow through each of them alternately in both directions depending on the motion of the damper piston (14).

2. A shock absorber as defined by claim 1, in which said at least one first throttle passage (30) having the variable throttle cross section is closed in the event of a defect in operation of said adjusting force.

3. A shock absorber as defined by claim 2, in which said at least one second throttle passage (90) includes at least one opening (91), and an effective throttle area (98) of smaller cross section than said at least one throttle passage (90) formed in the vicinity of said at least one opening (91) which determines a damping of the shock absorber (2) in the event of non-operability of said adjusting force means, and said control slide is in the terminal position.

4. A shock absorber as defined by claim 3, in which said control slide includes a plurality of openings (91).

5. A shock absorber as defined by claim 4, in which said control slide includes two openings (91), which are disposed diametrically opposed to one another on the control slide (34).

6. A shock absorber as defined by claim 4, in which said openings (91) are distributed at equal intervals over the control slide (34).

7. A shock absorber as defined by claim 6, in which said control slide includes two openings (91), which are disposed diametrically opposed to one another on the control slide (34).

8. A shock absorber as defined by claim 2, in which a first jacket face (64) is provided on the control slide (34) and a second jacket face (66) is provided on the valve body (44), and as a component of the at least one second throttle passage (90), at least said second jacket face (66) of the valve body (44) is interrupted by said valve chamber (68).

9. A shock absorber as defined by claim 2, in which a first jacket face (64) is provided on the control slide (34) and a second jacket face (66) is provided on the valve body (44), and as a component of the at least one second throttle passage (90), at least said first jacket face (64) of the control slide (34) is interrupted by an annular chamber (100).

10. A shock absorber as defined by claim 1, in which said at least one second throttle passage (90) includes at least one opening (91), and an effective throttle area (98) of smaller cross section than said at least one second throttle passage (90) formed in the vicinity of said at least one opening (91) which determines a damping of the shock absorber (2) in the event of non-operability of said adjusting force means, and said control slide is in the terminal position.

11. A shock absorber as defined by claim 10, in which said control slide includes a plurality of openings (91).

12. A shock absorber as defined by claim 11, in which said openings (91) are distributed at equal intervals over the control slide (34).

13. A shock absorber as defined by claim 12, in which said control slide includes two openings (91), which are disposed diametrically opposed to one another on the control slide (34).

14. A shock absorber as defined by claim 11, in which said control slide includes two openings (91), which are disposed diametrically opposed to one another on the control slide (34).

15. A shock absorber as defined by claim 10, in which a first jacket face (64) is provided on the control slide (34) and a second jacket face (66) is provided on the valve body (44), and as a component of the at least one second throttle passage (90), at least said second jacket face (66) of the valve body (44) is interrupted by said valve chamber (68).

16. A shock absorber as defined by claim 10, in which a first jacket face (64) is provided on the control slide (34) and a second jacket face (66) is provided on the valve body (44), and as a component of the at least one second throttle passage (90), at least said first jacket face (64) of the control slide (34) is interrupted by an annular chamber (100).

17. A shock absorber as defined by claim 1, in which a first jacket face (64) is provided on the control slide (34) and a second jacket face (66) is provided on the valve body (44), and as a component of the at least one second throttle passage (90), at least said second jacket face (66) of the valve body (44) is interrupted by said valve chamber (68).

18. A shock absorber as defined by claim 17, in which said valve chamber (68) is a first annular chamber disposed on the valve body, and a second annular chamber (100) is disposed on the control slide (34) radially juxtaposed said first annular chamber (68).

19. A shock absorber as defined by claim 1, in which at least one valve (99) is provided in said at least one second throttle passage (90).

20. A shock absorber as defined by claim 1, in which a first jacket face (64) is provided on the control slide (34) and a second jacket face (66) is provided on the valve body (44), and as a component of the at least one second throttle passage (90), at least said first jacket face (64) of the control slide (34) is interrupted by an annular chamber (100).

21. A shock absorber as defined by claim 1, in which said at least one second throttle passage (90) is confined within a body portion of said control slide axially below its upper end surface.

22. A shock absorber, including a cylinder, a damper piston displaceable in said cylinder, said damper piston divides said cylinder into a first and a second work chamber, said damper piston having at least one first throttle passage (30) having a variable throttle cross section in a fluid flow path between said first and said second work chambers, said first throttle passage (30) permits an alternate fluid flow in either direction from said first work chamber to the second work chamber and from said second work chamber to said first work chamber, a valve body, a valve chamber (68) in said valve body, a control slide that is adjustable with respect to said valve chamber in said valve body, a control slide, an adjusting force means that acts upon said control slide counter to a restoring force of a restoring spring, said adjusting force means applies an adjusting force which acts upon said control slide brought about by signals from said control device for adjusting said control slide and said variable cross section, between a minimum and a maximum throttle cross section value, a control position of the control slide relative to said valve chamber determines said variable throttle cross section of said at least one first throttle passage (30), and at least one second throttle passage (90) is provided in said control slide in which said at least one second throttle passage is covered when said control slide is in a position of maximum throttle cross section, if the adjusting force is inoperative, the control slide (34) is actuated into a terminal position by the restoring force of the restoring spring; and only in the terminal position, the at least one second throttle passage (90) is uncovered, in said uncovered position, said at least one second throttle passage (90) permits a fluid flow in either direction, from said first work chamber to said second work chamber and from said second work chamber to said first work chamber, the at least one second throttle passage (90) is larger than the minimum value of the variable throttle cross section of the at least one first throttle passage (30) and also smaller than the maximum value of the variable throttle cross section; and in the terminal position the variable throttle cross section of the at least one first throttle passage (30) and the at least one second throttle passage (90) allows pressure fluid to flow through each of them alternately in both directions depending on the motion of the damper piston (14).

23. A shock absorber as defined by claim 22, in which said at least one first throttle cross section is closed in the event of a defect in operation of said adjusting force which results in said annular control slide being forced to said terminal position.

24. A shock absorber as defined by claim 23, in which a first jacket face (64) is provided on the annular control slide (34) and a second jacket face (66) is provided on the valve body (44), and as a component of the at least one second throttle passage (90), at least said second jacket face (66) of the valve body (44) is interrupted by said annular valve chamber (68).

25. A shock absorber as defined by claim 23, in which a first jacket face (64) is provided on the annular control slide (34) and a second jacket face (66) is provided on the valve body (44), and as a component of the at least one second throttle passage (90), at least said first jacket face (64) of the annular control slide (34) is interrupted by a second annular chamber (100).

26. A shock absorber as defined by claim 23, in which said at least one second throttle passage (90) includes at least one opening (91), and an effective throttle area (98) of smaller cross section than said at least one second throttle passage (90) formed in the vicinity of at least one opening (91) which determines a damping of the shock absorber (2) in the event of a defect which results in said annular control slide being forced to said terminal position.

27. A shock absorber as defined by claim 26, in which said control slide includes a plurality of openings (91).

28. A shock absorber as defined by claim 27, in which said control slide includes two openings (91), which are disposed diametrically opposed to one another on the control slide (34).

29. A shock absorber as defined by claim 27, in which said openings (91) are distributed at equal intervals over the control slide (34).

30. A shock absorber as defined by claim 29, in which said control slide includes two openings (91), which are disposed diametrically opposed to one another on the control slide (34).

31. A shock absorber as defined by claim 22, in which said at least one second throttle passage (90) includes at least one opening (91), and an effective throttle area (98) of smaller cross section than said at least one second throttle passage (90) formed in the vicinity of at least one opening (91) which determines a damping of the shock absorber (2) in the event of a defect which results in said annular control slide being forced to said terminal position.

32. A shock absorber as defined by claim 31, in which a first jacket face (64) is provided on the annular control slide (34) and a second jacket face (66) is provided on the valve body (44), and as a component of the at least one second throttle passage (90), at least said first jacket face (64) of the annular control slide (34) is interrupted by a second annular chamber (100).

33. A shock absorber as defined by claim 31, in which a first jacket face (64) is provided on the control slide (34) and a second jacket face (66) is provided on the valve body (44), and as a component of the at least one second throttle passage (90), at least said second jacket face (66) of the valve body (44) is interrupted by said annular valve chamber (68).

34. A shock absorber as defined by claim 31, in which said control slide includes a plurality of openings (91).

35. A shock absorber as defined by claim 34, in which said control slide includes two openings (91), which are disposed diametrically opposed to one another on the control slide (34).

36. A shock absorber as defined by claim 34, in which said openings (91) are distributed at equal intervals over the control slide (34).

37. A shock absorber as defined by claim 36, in which said control slide includes two openings (91), which are disposed diametrically opposed to one another on the control slide (34).

38. A shock absorber as defined by claim 22, in which a first jacket face (64) is provided on the annular control slide (34) and a second jacket face (66) is provided on the valve body (44), and as a component of the at least one second throttle passage (90), at least said second jacket face (66) of the valve body (44) is interrupted by said annular valve chamber (68).

39. A shock absorber as defined by claim 38, in which a second annular chamber (100) is disposed on the annular control slide (34).

40. A shock absorber as defined by claim 22, in which at least one valve (99) is provided in said second throttle passage (90).

41. A shock absorber as defined by claim 22, in which a first jacket face (64) is provided on the annular control slide (34) and a second jacket face (66)is provided on the valve body (44), and as a component of the at least one second throttle passage (90), at least said first jacket face (64) of the annular control slide (34) is interrupted by a second annular chamber (100).

42. A shock absorber as defined by claim 22, in which said at least one second throttle passage (90) is confined within a body portion of said annular control slide axially below its upper end surface.

* * * * *